April 13, 1943.　　　E. STRUNK　　　2,316,298
CASTING MOLD FOR SYNTHETIC MATERIALS
Filed July 1, 1938　　　4 Sheets-Sheet 1

Inventor:
E. Strunk

April 13, 1943. E. STRUNK 2,316,298
CASTING MOLD FOR SYNTHETIC MATERIALS
Filed July 1, 1938 4 Sheets-Sheet 2

Inventor:
E. Strunk
By E. F. Wendroth
Atty.

April 13, 1943.　　　　　E. STRUNK　　　　　2,316,298

CASTING MOLD FOR SYNTHETIC MATERIALS

Filed July 1, 1938　　　4 Sheets-Sheet 3

Inventor:
E. Strunk
By C. F. Wendiroth
Atty

April 13, 1943. E. STRUNK 2,316,298
CASTING MOLD FOR SYNTHETIC MATERIALS
Filed July 1, 1938 4 Sheets-Sheet 4
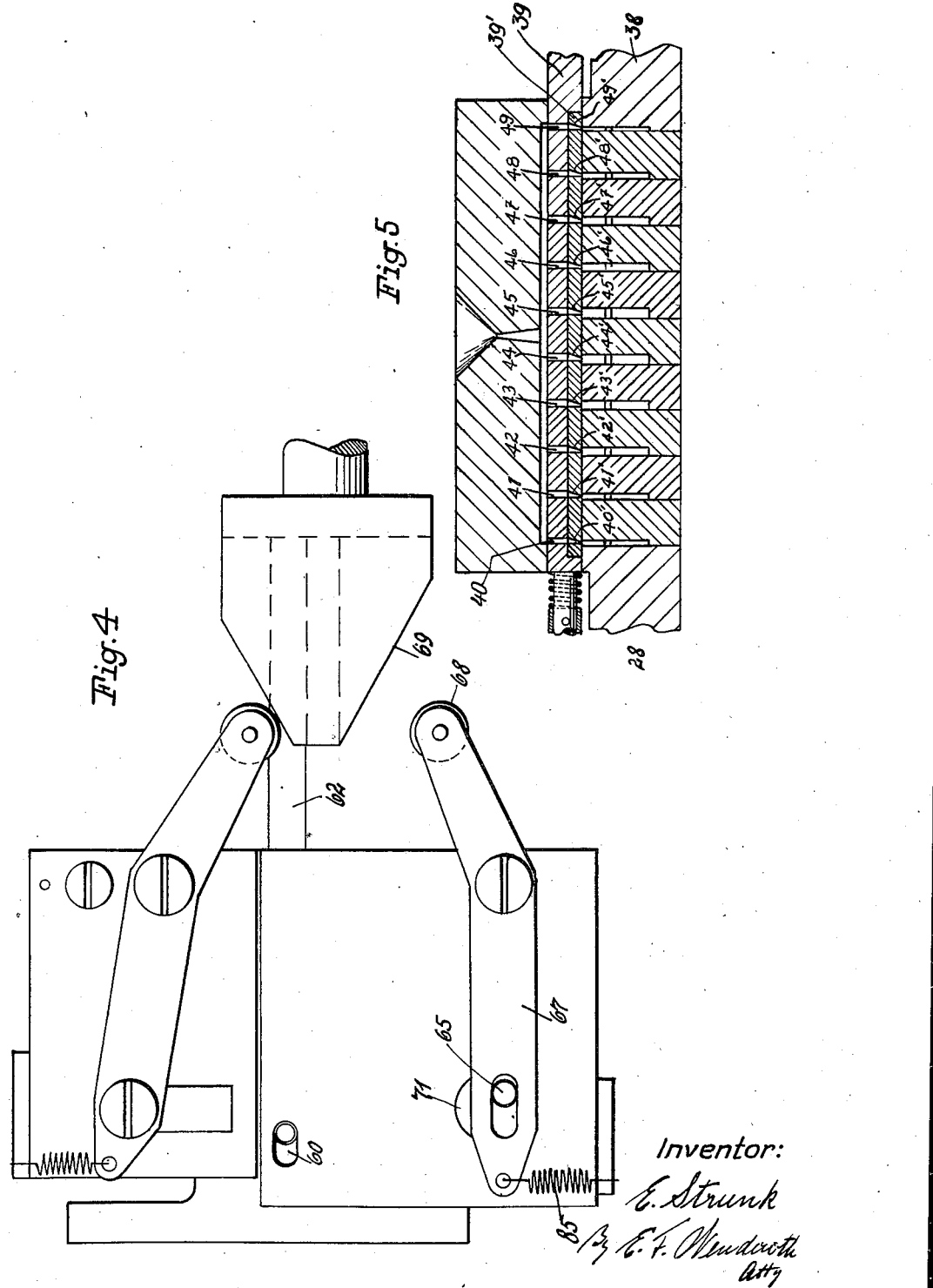
Inventor:
E. Strunk Patented Apr. 13, 1943

2,316,298

UNITED STATES PATENT OFFICE 2,316,298

CASTING MOLD FOR SYNTHETIC MATERIALS

Ernst Strunk, Berlin-Wilmersdorf, Germany; vested in the Alien Property Custodian Application July 1, 1938, Serial No. 217,087
In Germany July 3, 1937

2 Claims. (Cl. 18—34)

This application is a companion application to application Serial Number 217,088 filed July 1, 1938.

This invention relates to a casting mold for synthetic materials which are introduced into the mold in fused liquid condition preferably by extrusion casting. The casting mold according to the invention, in which the shaped body to be produced is surrounded on all sides by boundary mold walls and which is provided merely with at least one feeder head aperture, serves for producing shaped bodies, especially letters and the like. The mold is preferably constructed as a multiple mold, that is several shaped bodies of the same kind or of different kinds are produced at the same time in the mold.

In the known molds of this type the shaped body, or in the case of multiple molds all the shaped bodies, is or are ejected united with the feeder head. The feeder head is subsequently severed by breaking, cutting or otherwise.

According to the invention the disadvantage of a separate operation being required for removing the feeder head is overcome in that the feeder head is broken or sheared off automatically by a positive movement during the opening of the mold. This is attained for example in that the feeder head lies in a separate mold part which, during the opening of the mold, carries out a movement relatively to those mold parts in which the shaped bodies are located. The mold and the feeder heads in a multiple mold are preferably so arranged that merely a rectilineal movement, for example of the separate mold part in which the feeder head is located is necessary for severing the feeder heads from the shaped bodies. According to the invention at least one edge adjacent the shaped body of the feeder head channel in the separate mold part in which the feeder head is located is constructed like a knife or plane, for example acute angled.

Two embodiments of the invention are illustrated by way of example in the accompanying drawings, in which:

Fig. 4 shows the mold in top plan view, Fig. 5 is a section through a modified form of construction of the feeder head bar.

Figure 1:
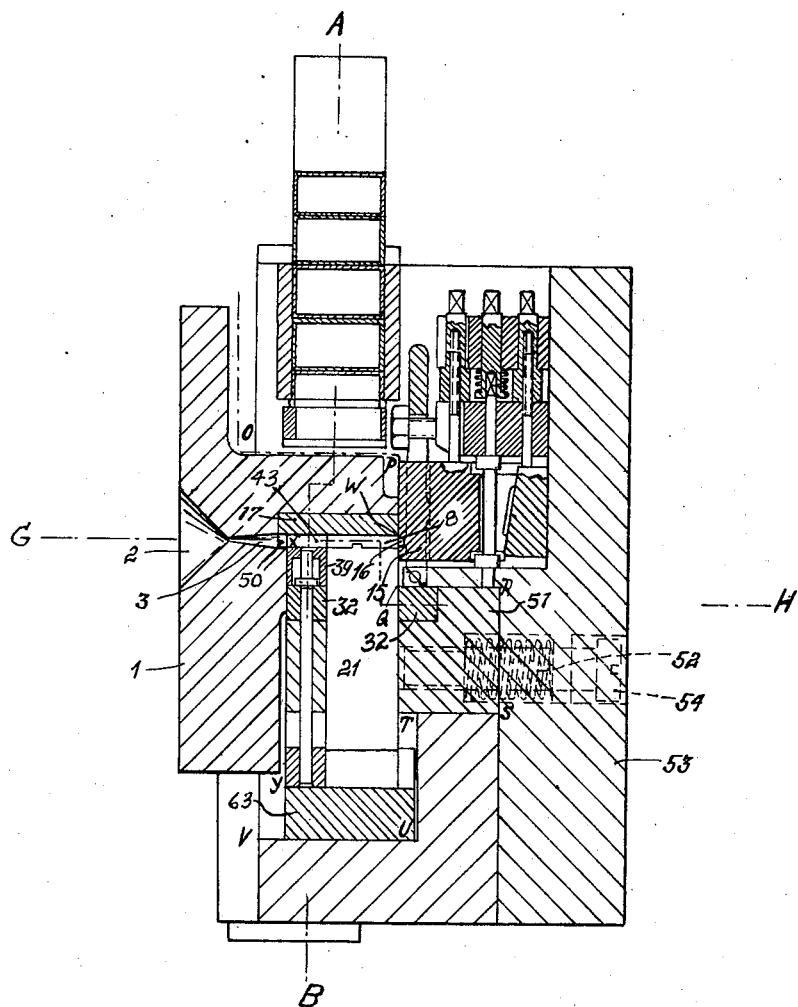
Fig. 1 shows the casting mold in horizontal section in inverted position.
Figure 2:
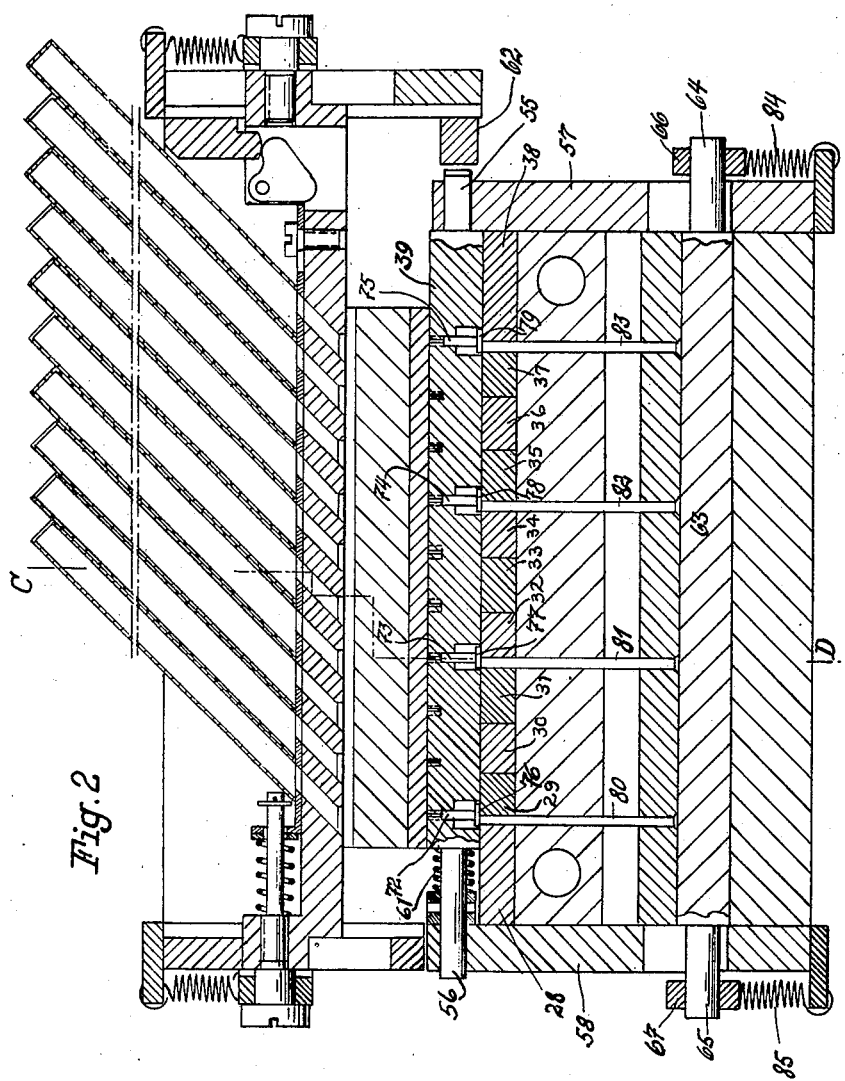
Fig. 2 is a vertical section on line A—B of Fig. 1 looking towards the extrusion casting nozzle.
Figure 3:
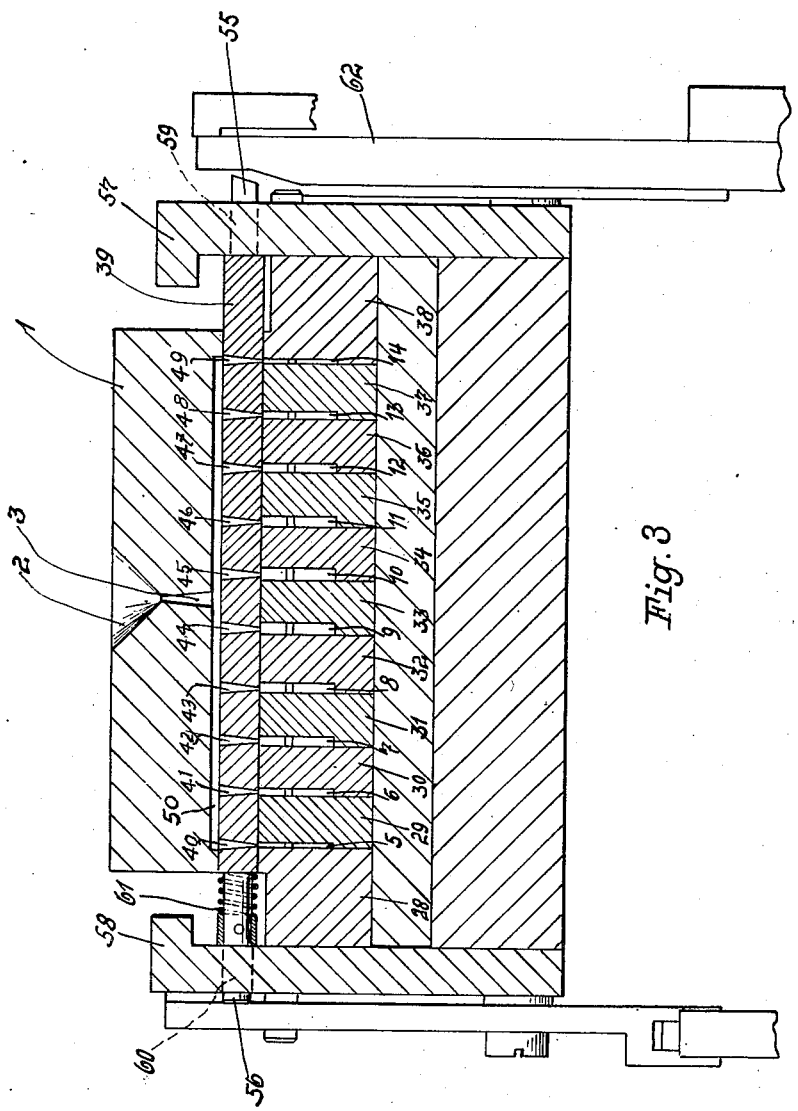
Fig. 3 is a vertical section on line G—H of Fig. 1.

The nozzle plate 1 of the casting mold has a funnel shaped aperture 2 against the wall of which bears the extrusion casting nozzle of the extrusion casting cylinder not shown in the drawings. The funnel shaped aperture 2 extends into a feeder head passage 3. A ten-part mold is illustrated in which the ten shaped bodies (letters) to be produced are designated by 5, 6, 7, 8, 9, 10, 11, 12, 13 and 14. The spaces for the shaped bodies 5 to 14 are closed on the side opposite the feeder head by matrices, in which the face of the letters is engraved. In Fig. 1 such a matrix 15 with the letter face 16 is shown.

One side face of the letter is formed by the nozzle plate 1, or by a hardened insert 17 rigidly connected therewith. The opposite face is formed by the cores 18—27, the core 21 being shown in elevation in Fig. 1. The two remaining side walls of the shaped body spaces are formed by fitting pieces 28—38. The space between the nozzle plate 1 and the insert 17, the fitting pieces 28—38 and the cores 18—27 is filled by the feeder head bar 39 which has feeder head channels 40—49 corresponding to the number of shaped bodies. A passage 50 is formed in the nozzle plate 1 extending from the feeder head aperture 3 so that all feeder head channels 40—49 are in communication with the feeder head aperture 3. This passage 50 may also be formed in the feeder head bar 39.

On the drawings the extrusion casting mold is illustrated in the position in which the extrusion casting is carried out and the shaped bodies are produced with the feeder head. After the extrusion casting the mold is opened by a known mechanism not shown in the drawings, the opening taking place along the parting line O—P—Q—R—S—T—U—V. Hereupon the matrices are first lifted off the shaped bodies and the lateral ejection movement of the shaped bodies is prepared.

The cores 18—27 are guided in corresponding slots in a guide 51. This guide is acted upon by a spring 52 which bears at its other end against a mold closing part 53. The spring 52 causes the mold to first open on the parting line indicated until the abutment face of a bolt 54 contacts with the mold closing part 53. Then the mold opens wider along the line O—P—Q—X—Y. At the same time the portion of the feeder head located in the feeder head aperture 3 and possibly in the passage 50 is pulled out of the nozzle plate 1 which easily separates from the nozzle.

The feeder head slide 39 has two pins 55 and 56 which are guided in slots 59 and 60 in the mold parts 57 and 58. A spring 61 holds the feeder head slide 39 in position for extrusion casting.

A cam 62 is rigidly connected with the machine frame. The bevelled end of the pin 55 bears against the cam 62 so that the feeder head channels 40—49 shift relatively to the shaped bodies 5—14 and the feeder heads are sheared cleanly off the shaped bodies, the feeder heads remaining united.

The cores 18—27, which border the hollow spaces for the shaped bodies on one side serve at the same time as ejectors for the shaped bodies. They are all fixed in a core holder 63. The core holder 63 carries two pins 64 and 65 and two two-armed slotted levers 66 and 67 each engage one of these pins. These two-armed levers are pivotally mounted on the mold parts 57 and 58, and rollers 68 are mounted one on the end of each of said levers and run on a cam 69 fixed on the machine frame, so that the desired ejecting movement is transmitted to the cores 18—27 by the levers 66 and 67 through the intermediary of the core holder 63.

To attain the necessary freedom of movement recesses 70 and 71 are provided in the mold parts 57 and 58. The ejected shaped bodies, in the example illustrated the letters, drop out of the mold and can be caught in a manner not described in detail.

Ejectors 72—75 serve for ejecting the feeder head and are widened to form plates 76—79 on the side remote from the feeder head. Plungers 80—83 are fixed on the core holder 63 and act on the plates 76—79. During the movement of the core holder 63 above described the feeder head is ejected at the same time through the intermediary of the plungers 80—83 and the ejectors 72—75. This feeder head is also caught in a suitable manner.

By dividing the ejecting means from the feeder head into feeder head ejectors 72—75 and plungers 80—83 it is possible to move the feeder head bar for the purpose of shearing off the feeder heads.

After the shaped bodies (letters) and the feeder head have been ejected, the mold is reclosed by known mechanism not shown on the drawings. The levers 66—67 are returned into their initial position by the springs 84 and 85, as the roller 68 at the same time runs off the cam 69. This causes the cores and plungers from the feeder head ejectors to return into their initial positions. The further movement will be clear from the drawings and the above description but take place in reversed order until the mold is again ready for extrusion casting, whereupon all the operations repeat periodically.

It has been found that the shearing off of the feeder heads takes place so smoothly and almost without burr that, for example in the case of letters, subsequent work is no longer necessary. The shearing should preferably take place at such a time after the extrusion that the feeder head is still sufficiently soft to permit of easy shearing yet is sufficiently hard to prevent smudging, thread drawing and the like.

The invention covers the provision of several feeder head bars in the case of large multiple molds, or the construction of the feeder head plate as a ring or disc in the case of the shaped bodies being arranged in a circle.

According to another advantageous form of construction of the invention the shearing of the feeder heads is facilitated by making the feeder head bar in the shape shown in Fig. 5. Here the boundary faces 40'–49' of the feeder head channels 40–49 are oblique, so that an acute angle, that is a cutting edge is formed in the shearing direction. Furthermore, the feeder head slide 39 is preferably divided so that the cutting edge lies in a separate hardened insert 39' which forms a kind of separate cutting blade.

According to another construction of the invention the device which effects the shearing movement of the feeder head bar 39 is so constructed that the feeder head bar, after the shearing movement, carries out a counter movement which is at least so long that the edges of the bordering faces 40"–49" of the feeder head channels 40–49 pass over the end faces of the shaped bodies. Thus, in certain instances a smoothing of the feeder head burr is attained.

The drawings only show by way of example a possible form of construction of the invention. It is evident that the inventive idea may be applied to other constructions. Thus, for example individual molds of the multiple mold may be arranged in a circle. In this case the feeder heads, which might then be radial, are shorn off by a turning movement of the feeder head mold part relatively to the other mold part.

I claim:

1. A multiple casting mold for synthetic materials, comprising mold parts with spaces for casting shaped bodies, and a feeder head part with feeder channels leading to said spaces, said feeder head part being movable relatively to said mold parts during the opening of the mold to sever the feeder head from the shaped bodies, and separate ejectors on said feeder head part for ejecting the feeder head.

2. A multiple casting mold for synthetic materials supplied from a spray nozzle comprising a nozzle plate having a feeder channel therein, a feeder head bar located adjacent said plate having a plurality of feeder head chambers therein in communication with said feeder channel, a series of molds, each of said molds being located adjacent one of said chambers and having communication with such associated chamber, means for moving said bar relatively to said molds after casting for separating the feeder heads therein from the molded articles in said molds, means for ejecting said molded articles from said molds after said feeder heads have been separated therefrom, and means mounted in said bar for ejecting said feeder heads.

ERNST STRUNK.